UNITED STATES PATENT OFFICE.

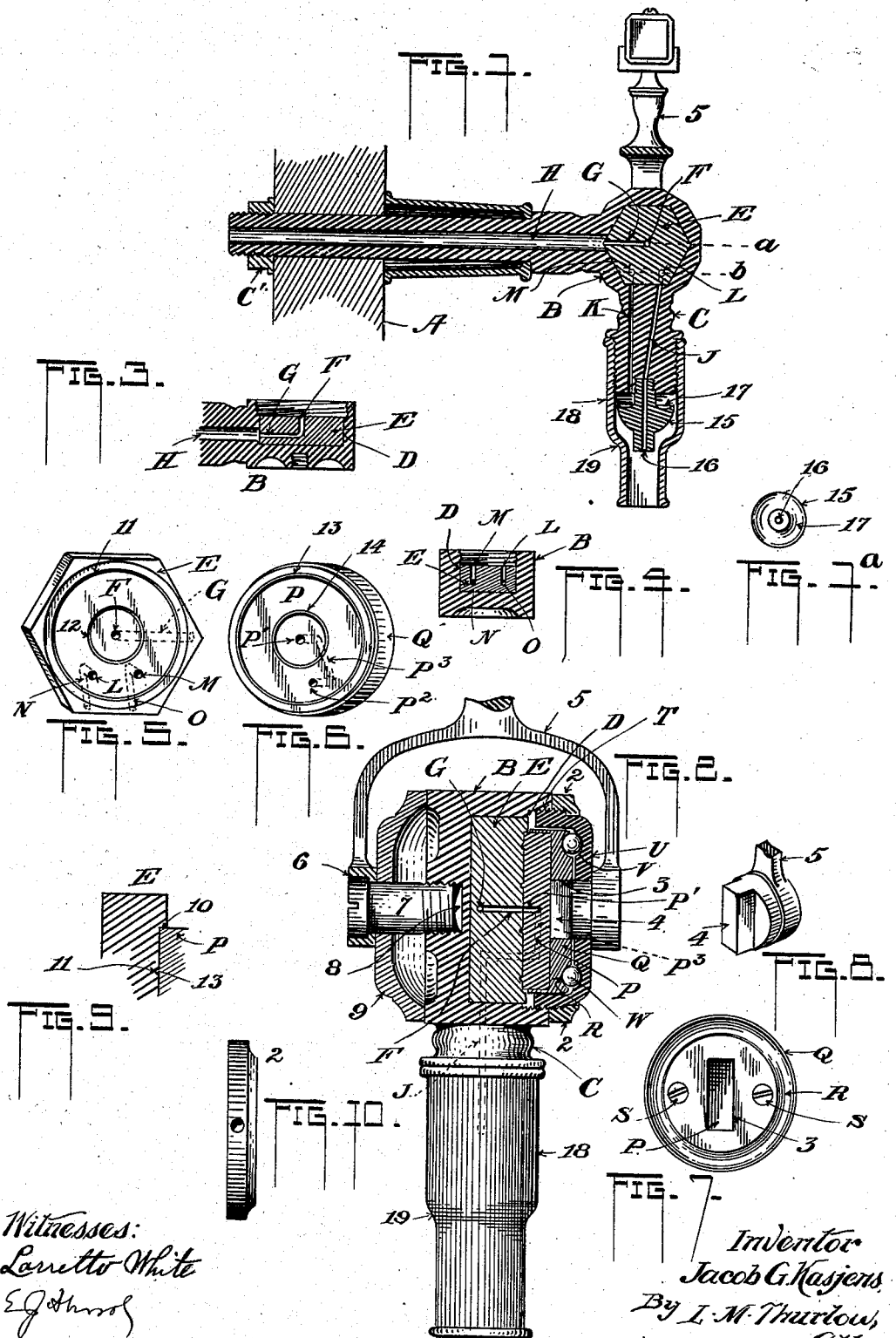

JACOB G. KASJENS, OF PEORIA, ILLINOIS.

FAUCET.

No. 900,385.        Specification of Letters Patent.        Patented Oct. 6, 1908.

Application filed May 13, 1907. Serial No. 373,525.

*To all whom it may concern:*

Be it known that I, JACOB G. KASJENS, a citizen of the United States, residing at Peoria, in the county of Peoria and State of Illinois, have invented certain new and useful Improvements in Faucets; and I do hereby declare that the following is a full, clear, and exact description of the invention, which will enable others skilled in the art to which it appertains to make and use the same.

This invention relates to improvements in faucets, and more particularly to a faucet adapted for use on soda fountains for drawing fluids under pressure.

The object of the present invention is to provide a faucet of the character described which can be made fluid tight but can at the same time be easily operated.

A further object is to provide a faucet of the character described in which great pressure can be used to maintain a tight joint for preventing leakage of fluid without in any way affecting the free and easy movement of the lever of said faucet.

A further object of the invention is to provide two peculiarly constructed facing and contacting valve members or disks, one stationary and the other movable, the face of the stationary one having a raised outer annular flange within which the movable disk snugly fits to prevent leakage.

Another object is to provide the surface of one of these disks with concentric annular grooves, the other having corresponding annular flanges to seat therein to further assist in preventing leakage between the disks, all of which will be clearly pointed out in the following specification.

In my improved faucet I provide means for holding the faces of the valve and valve seat together with considerable pressure and also provide a series of balls between one of the disks and the operating means which will permit said faucet to be easily operated regardless of the friction between the contacting faces.

I am aware that it is not new to combine a series of balls with a faucet for reducing friction nor to provide concentric annular grooves and flanges, but I believe that the particular combination and arrangement of parts described and claimed has not heretofore been used. In my faucet I employ an adjusting portion for tightening the parts and this is positively held by means of a lock-nut so that the most delicate adjustment can be made and kept by means of said lock nut.

In the appended drawing, Figure 1 is a longitudinal sectional elevation of the faucet. Fig. 1ª is a top view of a nozzle. Fig. 2 is a front elevation of the faucet in part section. Fig. 3 is a horizontal section of a portion of the faucet taken on line *a*, Fig. 1. Fig. 4 is a horizontal section of the same on line *b*, Fig. 1. Fig. 5 is a perspective view of one of the disks of the faucet. Fig. 6 is a perspective view of a second disk. Fig. 7 is a face view of a member showing the ball-race therein. Fig. 8 is a perspective view of one extremity of an operating lever of the faucet. Fig. 9 is an enlarged view in cross section of part of two contacting disks shown in Figs. 2, 5 and 6. Fig. 10 is an edge view of a locking ring.

A indicates the front wall of the fountain to which the faucet is secured.

B is the body of the faucet which extends through the wall A being secured therein by suitable means, such for instance, as a nut C'. The outer end of the faucet has a depending portion C through which the fluid is drawn.

As shown in Fig. 2 in transverse section the head of the faucet is provided with a socket D which receives a disk E (Fig. 5) of hard rubber or leather or any other substance that may be found best suited to the purpose. This disk, as shown in Fig. 3, has a central aperture at F communicating with a passage G extending at right angles thereto as shown in said Fig. 3 the end of which opens into a central fluid passage H in the faucet B, through which the fluid is drawn. In said depending portion C of the faucet are two passages J and K the lower end of the former extending to the center of the said portion C, the passage K terminating at one side of the center as clearly shown in Fig. 1.

In the disk E just described, and as clearly shown in Figs. 1 and 5, are two apertures L and M which open through the face of the disk each being located at the same distance from the center of said disk, said apertures communicating with internal passages N O, Fig. 5, which communicate with the passages J and K respectively, in the portion C.

P is a disk of hard rubber or leather or other suitable material which is carried by a cup Q, Fig. 2, said disk adapted to bear against the disk E as shown. The said cup Q has in its outer face a ball race R, Fig. 7, and the disk P is secured in this member as, for instance, by screws S shown in the figure last referred to. The inner annular surface of the faucet adjacent to the disk E is provided with screw threads T designed to be engaged by a cupped member U having a ball race V inside it to correspond with the ball race R of the member Q just described, there being a series of balls W lying between the two members Q U in the ball race just described.

At 2, Figs. 2 and 10, is a ring internally threaded to screw upon the threaded portion of the member U as shown, and constitutes a lock-nut so that after the said member U is tightened to the required extent the ring 2 when tightened will hold the member U firmly in place so that it cannot voluntarily shift. This locking means, however, is well known in many of the arts and requires no further description.

The member Q is provided with a rectangular opening 3 for receiving a correspondingly formed projection 4 on one extremity of the lever 5 of the faucet. The opposite extremity of this lever has a counter-sunk hole at 6 for receiving the head of a screw 7 the latter being threaded into an aperture 8 of the faucet head, there being an ornamental cap 9 interposed between the lever and the said head as shown. Preferably the face of the disk E has a depression therein as shown at 10, Fig. 9, to receive the opposite disk P, this depression being of such size that said disk P will snugly fit into it. This depression is also provided with two concentric annular recesses 11 and 12 and the disk P has two correspondingly positioned annular concentric raised portions 13 and 14 adapted to enter said depressions. By thus forming the faces of the disks it is quite evident that there will be small chance of leakage of fluids from the apertures outside the disk. If, for any reason, the fluids were to escape from the apertures it could not get past these depressions. At the lower end of the depending portion C of the faucet is attached a nozzle 15 having a central passage 16 communicating with the passage J before described. The nozzle 15 has an annular cupped space at 17 which lies immediately beneath the discharge end of the passage K. Screwed upon the portion C and inclosing the said nozzle is a member 18 having a contraction at 19 just below the said nozzle the purpose of which will be presently explained.

Returning to the disk P it will be seen in Fig. 6 that it is provided with a central aperture P' which corresponds in position with the aperture F of the disk E. Also at $P^2$ in said disk P is an aperture which corresponds exactly in position with the apertures M N in that it is the same distance from the center of the disk as the two apertures M N just mentioned so that when the disks are turned upon one another the central apertures of both will be in constant register while the other apertures will be in register only at certain times. Said apertures P' and $P^2$ are connected by a common passage $P^3$ shown in broken lines in Fig. 6. It will be noted in Figs. 1 and 3 that the passage G of the disk E is always in communication with the passage H of the faucet and that the aperture P' of the disk P, as just stated, is in constant register with the aperture F. With the lever 5 occupying the raised position as shown in Fig. 1, the aperture $P^2$ is held closed by the opposite disk E but when the lever is pulled down to draw fluid said aperture $P^2$ is carried into register with the aperture L of the disk E, the fluid being liberated through the passage J and the passage 16 of the nozzle 15. When desired to have an indirect flow of fluid the lever is thrown backward or toward the fountain thereby placing the aperture $P^2$ in register with the aperture M of the disk E. The flow of fluid will be through the passage K, whence it is ejected upon the annular grooved seat 17 of the nozzle thence running down through the contracted neck of the member 18.

The cupped member U remains stationary within the head of the faucet being secured rigidly in place by means of the locking arrangement 2 hereinbefore described. The extremity of the lever 5 extends through said member U so that the projection 4 can engage the depression 3 of the member Q. When the lever is moved the member Q is made to turn inside the said member U to shift the disk P the balls freely permitting such movement.

It is well known that where means is provided by which to tighten the parts of a faucet to prevent leakage that after such tightening the friction between the parts is often so great that it is sometimes impossible to move the lever. This is also true to a greater or less extent in a faucet having flat faced opposed disks as herein described. And it is here that I have found it necessary to provide anti-friction means, and have found that by my construction I am enabled to use unlimited pressure to hold the disks together for preventing leakage and yet am enabled to swing the lever with perfect freedom. It is my desire, in this application, to claim the disks E and P with their grooves and flanges and letting the surface of one of such disks into the other as described and shown for preventing leakage.

Having thus described my invention, I claim,

1. In a faucet the combination of the body of the faucet having a central bore, a disk seated therein having a substantially flat face and also having a raised annular flange extending up from said face, a second disk also having a substantially flat face and adapted to rest upon that of the first said disk, and also to seat within the said flange, the said faucet having fluid passages therein, there being passages in the first said disk having terminal opening through the face of the said disk, there being a passage in the second disk having two terminals opening through its face and adapted to register with those of the passages of the first disk, a member for carrying said second disk, an adjusting device adjacent to said member for holding the disks together with pressure, a series of balls interposed between the member and said adjusting device, and means for turning the second disk upon the first.

2. In a faucet the combination of the body of the faucet having a central bore, a disk seated therein having a substantially flat face, and also having a raised annular flange extending up from said face, a second disk also having a substantially flat face and adapted to rest upon that of the first said disk, and to seat within the said flange, the said faucet having fluid passages therein, there being passages in the first said disk having terminals opening through the face of said disk, there being a passage in the second disk having two terminals opening through its face and adapted to register with those of the passages of the first disk, a member for carrying said second disk, an adjusting device adjacent to said member for holding the disks together with pressure, a series of balls interposed between the member and said adjusting device, means for securing the adjusting device in position, and means for turning the second disk upon the first.

In testimony whereof I affix my signature, in presence of two witnesses.

JACOB G. KASJENS.

Witnesses:
C. B. McDougal,
L. M. Thurlow.